US005553800A

United States Patent [19]
Falk

[11] Patent Number: 5,553,800
[45] Date of Patent: Sep. 10, 1996

[54] APPARATUS FOR WINDING A TAPE-LIKE MATERIAL

[75] Inventor: Gerhard Falk, Rossdorf, Germany

[73] Assignee: U.S. Philips Corporation, New York, N.Y.

[21] Appl. No.: 293,983

[22] Filed: Aug. 22, 1994

[30] Foreign Application Priority Data

Aug. 28, 1993 [DE] Germany .................. 43 29 045.0

[51] Int. Cl.⁶ ................................................ B65H 20/00
[52] U.S. Cl. .................... 242/353; 242/334.6; 242/615; 226/190
[58] Field of Search ................ 242/334, 334.6, 242/346, 346.1, 346.2, 353, 419, 419.6, 548, 548.3; 226/158, 159, 190, 194, 195

[56] References Cited

U.S. PATENT DOCUMENTS 3,019,999  2/1962  Schiff .
4,739,948  4/1988  Rodal et al. ............................ 318/6
5,152,444  10/1992  Saito ................................... 226/196
5,263,625  11/1993  Saito ................................... 242/615
5,310,133  5/1994  Falk et al. ........................... 242/334.6
5,373,982  12/1994  Takahashi ............................ 226/190

FOREIGN PATENT DOCUMENTS 4130791  3/1993  Germany .
61-10452  5/1986  Japan .
568074  8/1977  U.S.S.R. ............................. 242/615
624284  9/1978  U.S.S.R. ............................. 242/615

*Primary Examiner*—John P. Darling
*Attorney, Agent, or Firm*—Brian J. Wieghaus

[57] ABSTRACT

The density of winding of tape onto a reel at high winding speeds is improved by oscillatory longitudinal translation of a portion of the tape, to induce tape tension oscillations. This substantially precludes slipping of the layers on the reel. To initiate the tension oscillations, a tape tension controller in a video tape recorder is vibrated by a motor whose torque is varied periodically. In another embodiment, the spindle of a guide roller is mounted for eccentric rotation by a drive motor.

17 Claims, 2 Drawing Sheets

APPARATUS FOR WINDING A TAPE-LIKE MATERIAL

BACKGROUND OF THE INVENTION

The invention relates to an apparatus for winding a tape-like material from a supply reel onto a take-up reel, in which tape-guide elements guide the tape-like material along a given tape-guide path and in which at least one winding device drives the reels.

In magnetic-tape video apparatuses fast forward or reverse winding of the magnetic tape is possible for the purpose of replaying or fast-motion reproduction. The magnetic tape can then be wound from a supply reel onto a take-up reel at up to 50 times its transport speed for normal reproduction. On its way to the take-up reel the magnetic tape travels in the customary manner past a rotating scanning device, a plurality of tape-guide elements and one or two tape-tension controllers. These tape-tension controllers control the torque of reel drives which drive the two reels to maintain a predetermined tape tension, and thereby determine the winding density of the magnetic tape wound onto the take-up reel. At a normal reproduction speed, for which the tape transport speed corresponds to the transport speed during recording, and at low winding speeds the magnetic tape can be wound with a satisfactory winding density. However, this is no longer the case at high winding speeds as a result of air which is trapped between the winding layers and which can escape only later. The attendant slackening of the tape then gives rise to a slacker winding, which leads to slipping of the winding layers, as a result of which the tape tension and the tape transport speed may vary abruptly, so that tape loops are formed in the transport path of the magnetic tape.

A method of avoiding tape loops during winding of magnetic tape is known from JP 61-104352. In this known method the driver stages of the winding motors for the magnetic tape receive a phase-shifted pulse signal which influences the current through the winding motors in such a manner that the tape tension of the magnetic tape varies with a period of 100 ms.

Moreover, U.S. Pat. No. 3,019,999 describes a winding device in which a web material is unwound from a supply reel at a given speed of transport and is wound onto a drive shaft whose torque is interrupted periodically.

Finally, DE-41 30 791 A1 discloses a device for winding string-shaped or web-shaped materials onto a take-up roller which is driven by a drive means, in which the drive means alternately exerts a comparatively low tractive force on the material in a first time interval and a comparatively high tractive force in a second time interval in order to tauten the material taken up in the first time interval.

The known devices have the disadvantage that for a dense winding pulsating torques are applied to the magnetic tape via the reel drive of the take-up reel. However, the magnitude of the applied pulsating torques is not constant but varies with the instantaneous winding diameter and the moment of inertia of the winding. A satisfactory winding density can be obtained only for a small take-up diameter because the tape tension is then higher than in the case of large take-up diameters. However, a higher tape tension reduces the life of the rotating magnetic heads of the scanning device.

SUMMARY OF THE INVENTION

Therefore, it is an object of the present invention to provide an apparatus of the type defined in the opening paragraph, which substantially eliminates slipping of the layers of the tape-like material to be wound onto the take-up reel independently of the diameter of the winding on the take-up reel.

This object is achieved by providing at least one device for initiating tape tension oscillations in the longitudinal direction of the tape material, through oscillatory translation of a portion of the tape.

The apparatus in accordance with the invention has the advantage that owing to an increased winding density slipping of layers (cinching) is precluded even in the case of a low take-up tape tension and high winding speeds.

In one embodiment of the invention the device for initiating oscillations is a tape tension controller associated with the take-up reel, comprising a pivotably supported tape-tension lever driven by a motor.

In a further embodiment of the invention the device for initiating oscillations is a vibrating tape-guide element arranged in the vicinity of the take-up reel.

A special advantage of these embodiments is that by modifying tape-guide elements already present in the tape-transport path, such as tape-tension controllers, a tape-guide pin or a tape-guide roller, the vibrations can be generated which are necessary to initiate the tape-tension oscillations in the tape material in order to obtain the required winding density.

In another embodiment of the invention, in order to reduce the mechanical complexity, the vibrating tape-guide element is an eccentrically disposed guide roller in the tape guide path of the tape-like material, which roller can be set into rotation by a motor.

An embodiment of the invention will now be described in more detail, by way of example, with reference to the drawings.

DESCRIPTION OF THE PREFERRED EMBODIMENT

Figure 1:
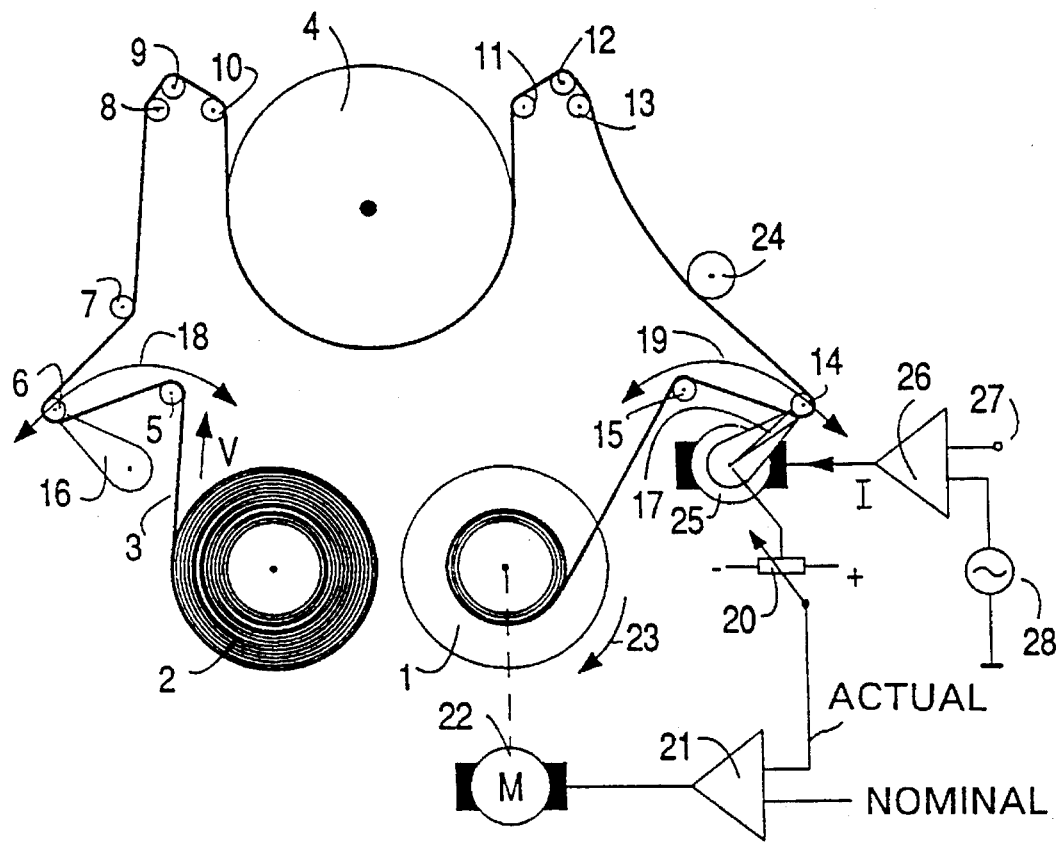
FIG. 1 shows a tape transport device with a vibrating tape-tension controller in a first embodiment of the invention.

The tape transport device for a magnetic-tape apparatus shown diagrammatically in FIG. 1 has a take-up reel 1 and a supply reel 2. In the reproducing/recording mode and during fast forward winding a magnetic tape 3 is unwound from the supply reel 2 and is moved past a rotating scanning device 4 to the take-up reel 1 via various tape guide elements. Tape transport proceeds in the opposite direction during reverse play and fast reverse winding.

The tape guide elements, which are disposed at fixed points in the tape transport path, guide the magnetic tape 3 in the vertical direction. In the present embodiment the magnetic tape 3 is guided by guide rollers 5 to 15, the guide rollers 6 and 14 being mounted on the respective ends of pivotable lever arms 16 and 17, respectively, which arms are movable in the directions indicated by the arrows 18 and 19, respectively, in dependence on the tape tension. The angular positions of the lever arms 16 and 17 are converted into electric signals by means of respective angle detectors. In FIG. 1 respective angle detectors is shown diagrammatically as a potentiometer 20. The wiper spindle of the potentiometer 20 is mechanically coupled to the other end of the pivotably supported lever arm 17. An output signal of the potentiometer 20 is applied to a control amplifier 21, which performs the nominal/actual value comparison in order to generate a control signal for controlling the speed of a winding motor 22 which drives the take-up reel 1 in the direction indicated by the arrow 23. The winding servo comprising the elements 14, 17, 20, 21, 22 and 1 determines the tape tension and the winding speed in the case of fast forward winding of the magnetic tape 3. Likewise, a similar tape winding servo has been provided for driving the supply reel 2, but this winding servo is not shown for the sake of simplicity. In the normal reproducing and recording mode the tape transport speed is determined by the speed of a capstan 24, which is in frictional engagement with the magnetic tape 3.

In a first embodiment of the invention the lever arm 17 with the guide roller 14 carried by this arm is pivoted against the magnetic tape 3 and thereby increases the tape tension of the magnetic tape 3. The shaft of the motor 25 is locked in rotation to the end of the pivotable lever arm 17. The instantaneous tape tension can be defined by means of a current I supplied to the motor 25 by an amplifier 26 depending upon a set-point voltage applied to a terminal 27 and an alternating voltage supplied by an a.c. generator 28. In the amplifier 26 the alternating voltage supplied by the generator 28 is superimposed on the set-point voltage. The varying motor current causes the torque of the motor 25 to vary accordingly, causing the pivotal arm 17 to vibrate angularly about the arm's axis in accordance with the frequency selected for the a.c. generator and thus to vibrate a portion of the tape 3 translationally along its longitudinal direction. The magnitude of the vibration can be influenced by the amplitude of the alternating voltage supplied by the a.c. generator 28.

As a result of the generation of brief impulses which accompany the vibration of the pivotable lever arm 17 and which act in the take-up direction so as to translate a portion of the tape in an oscillatory fashion at the vibration frequency, a dense winding is obtained whose density is also satisfactory at high winding speeds and a low tape tension, which precludes slipping between the layers of tape thus wound. This advantageous effect becomes apparent particularly when large-size magnetic-tape cassettes are used, for example when D-1.L cassettes (EBU Standard Tech. 3252-E) having a winding diameter of 174 mm are used.

For fast reverse winding of the magnetic tape 3 the pivotable lever arm 6 should be set into vibration. This requires the use of a device corresponding to that comprising the elements 25 to 28.

Figure 3:
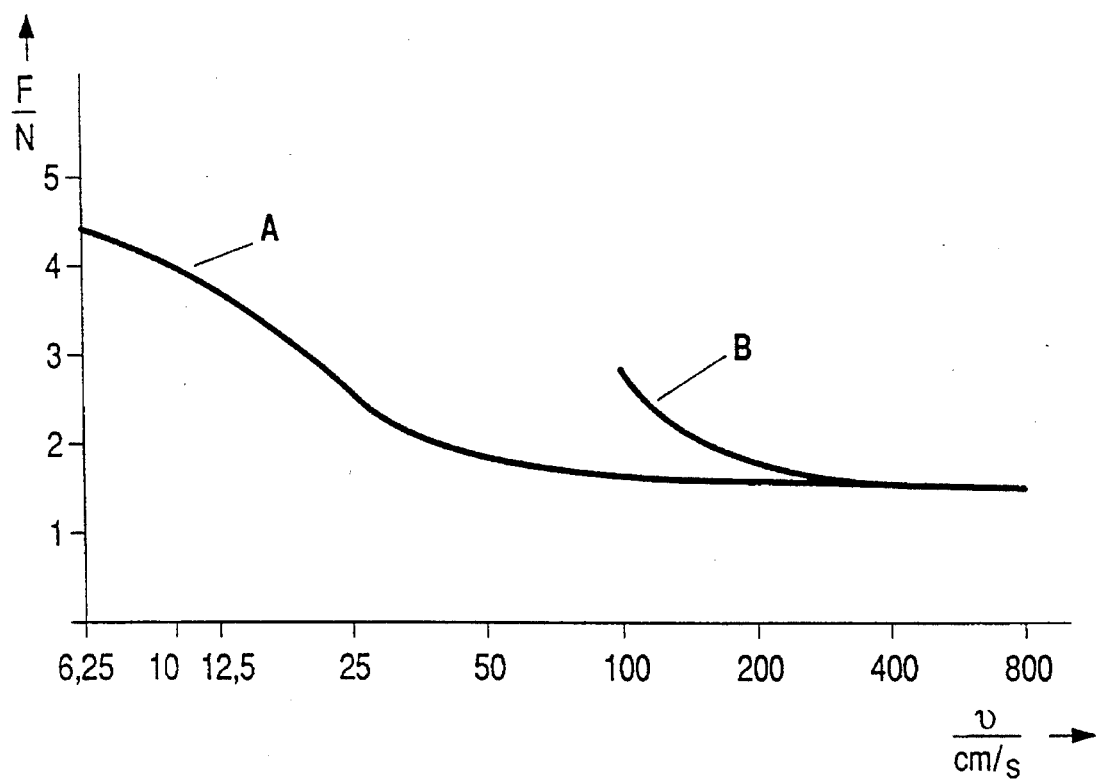
FIG. 3 is a diagram of the winding density as a function of the tape transport speed.

FIG. 3 shows a diagram in which the winding density F per newton has been plotted on the Y-axis and the transport speed v of the magnetic tape 3 in cm/s on the X-axis. The curve A represents the winding density F as a function of the tape transport speed v for a take-up tape tension of 0.6 newtons and a tape transport device without vibration of a tape tension controller 14, 17, 25 to 28 associated with the take-up reel 1. In comparison therewith the curve B represents the winding density F as a function of the tape transport speed v for a take-up tape tension of 0.5 newtons with a vibrating tape tension controller, the vibration frequency being approximately 100 Hz. The diagram shows that in spite of a lower take-up tape tension the use of the apparatus in accordance with the invention enables the winding speed to be more than tripled for the same winding density. The winding density has been measured with a force measuring device coupled to a loose end of the wound magnetic tape, to determine the force at which slipping of the layers occurred each time.

Figure 2:
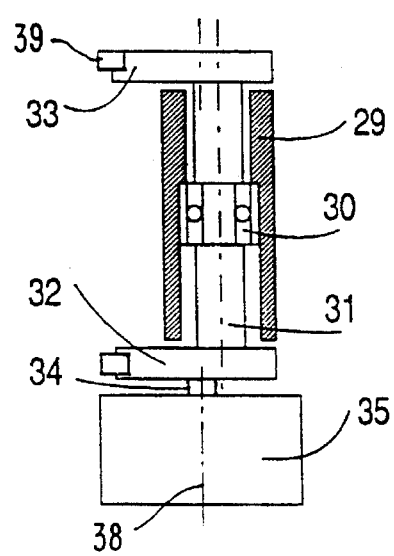
FIG. 2 shows diagrammatically a vibrating guide roller in a second embodiment of the invention.

FIG. 2 shows diagrammatically a vibrating guide roller, for example the guide roller 15. This vibrating guide roller basically comprises a roller 29 mounted for rotation and oscillation about a spindle 31 by means of a ball-bearing 30. The ends of the spindle 31 are eccentrically secured between a lower flange 32 and an upper flange 33. The lower flange 32 is concentrically locked in rotation to the drive shaft 34 of a motor 35. The motor rotates with a speed of, for example, 6000 revolutions per minute about an axis 38, so that impulses which influence the tape tension by oscillatory longitudinal translation of a portion of the tape are imparted to the magnetic tape with a frequency of 100 Hz. The magnitude of the impulses depends on the eccentricity of the spindle 31 secured to the lower flange 32. In order to compensate for the dynamic unbalance caused by the rotation the flanges 32 and 33 have been provided with balancing masses 39.

To simplify the mechanical construction a vibrating guide pin may be used instead of a vibrating guide roller. The roller 29 and the ball-bearing 30 can then be dispensed with. The magnetic tape is now guided by the spindle 31, the height position of the magnetic tape 3 being determined by the flanges 32 and 33.

I claim:

1. An apparatus for winding a tape from a supply reel onto a take-up reel, comprising a tape-guide element for guiding the tape along a tape-guide path, and a winding device for driving the take-up reel, characterized in that the device further comprises means, operating at a selected frequency, for imparting oscillatory translation at said selected frequency to a portion of the tape in the tape longitudinal direction, thereby initiating tape tension oscillations.

2. An apparatus as claimed in claim 1, characterized in that said tape guide element is arranged in the vicinity of the take-up reel, and said means comprises said tape guide element and means for vibrating the guide element.

3. An apparatus as claimed in claim 2, characterized in that said tape guide element is a vibrating guide pin.

4. An apparatus for winding a tape from a supply reel onto a take-up reel, comprising a tape tension controller associated with the take-up reel, and a winding device for driving the take-up reel, characterized in that the tape tension controller comprises a pivotally supported tape tension lever and a motor for pivotally vibrating the tape tension lever, to initiate tape tension oscillations while the tape is being wound.

5. An apparatus as claimed in claim 4, characterized in that torque of said motor is controlled by a current on which an alternating current of selected amplitude and frequency is superimposed.

6. An apparatus for winding a tape from a supply reel onto a take-up reel, comprising a tape-guide element for guiding the tape along a tape-guide path, and a winding device for driving the take-up reel, characterized in that said tape guide element is an eccentrically mounted guide roller disposed in the vicinity of the take-up reel, arranged for initiating tape tension oscillations in the longitudinal direction of the tape.

7. An apparatus as claimed in claim 6, characterized in that the guide roller is mounted on an eccentric spindle, and the apparatus further comprises a motor for rotating said spindle eccentrically about an axis which is perpendicular to the tape longitudinal direction.

8. An apparatus as claimed in claim 7, characterized in that the guide roller is mounted on the spindle by a ball bearing to permit swinging and rotation.

9. An apparatus as claimed in claim 7, characterized in that said motor rotates said eccentric spindle at a speed between 100 and 10,000 revolutions per minute.

10. An apparatus as claimed in claim 9, characterized in that the guide roller is mounted on the spindle by a ball bearing to permit swinging and rotation.

11. An apparatus as claimed in claim 7, characterized in that the apparatus further comprises an upper flange and a lower flange fixed to upper and lower ends of the spindle respectively, said flanges being concentric with said axis and a shaft of said motor.

12. An apparatus as claimed in claim 11, characterized in that the guide roller is mounted on the spindle by a ball bearing to permit swinging and rotation.

13. An apparatus as claimed in claim 11, characterized in that said motor rotates said eccentric spindle at a speed between 100 and 10,000 revolutions per minute.

14. An apparatus as claimed in claim 11, characterized in that the upper and lower flanges are disposed parallel to each other, and each include a balancing mass to compensate for dynamic unbalance.

15. An apparatus as claimed in claim 14, characterized in that said motor rotates said eccentric spindle at a speed between 100 and 10,000 revolutions per minute.

16. An apparatus as claimed in claim 14, characterized in that the guide roller is mounted on the spindle by a ball bearing to permit swinging and rotation.

17. An apparatus as claimed in claim 16, characterized in that said motor rotates said eccentric spindle at a speed between 100 and 10,000 revolutions per minute.

* * * * *